US009863296B2

(12) United States Patent
Pogén

(10) Patent No.: US 9,863,296 B2
(45) Date of Patent: Jan. 9, 2018

(54) CENTRIFUGAL SEPARATOR HAVING OIL COATING ON SIDEWALLS

(71) Applicant: ALFA LAVAL CORPORATE AB, Lund (SE)

(72) Inventor: Mats-Örjan Pogén, Billeberga (SE)

(73) Assignee: ALFA LAVAL CORPORATE AB, Lund (SE)

( * ) Notice: Subject to any disclaimer, the term of this patent is extended or adjusted under 35 U.S.C. 154(b) by 445 days.

(21) Appl. No.: 14/396,954

(22) PCT Filed: May 7, 2013

(86) PCT No.: PCT/EP2013/059525

§ 371 (c)(1),
(2) Date: Oct. 24, 2014

(87) PCT Pub. No.: WO2013/171101

PCT Pub. Date: Nov. 21, 2013

(65) Prior Publication Data

US 2015/0119226 A1 Apr. 30, 2015

(30) Foreign Application Priority Data

May 18, 2012 (EP) .................................... 12168532

(51) Int. Cl.
*F01M 13/04* (2006.01)
*B04B 5/12* (2006.01)
(Continued)

(52) U.S. Cl.
CPC ............... *F01M 13/04* (2013.01); *B04B 5/12* (2013.01); *B04B 9/06* (2013.01); *B04B 11/02* (2013.01);
(Continued)

(58) Field of Classification Search
CPC .. F01M 13/04; F01M 2013/0422; B04B 5/12; B04B 9/06; B04B 2005/125
(Continued)

(56) References Cited

U.S. PATENT DOCUMENTS 2,575,315 A * 11/1951 Lowell .................... F02B 75/22 123/196 A
4,269,607 A * 5/1981 Walker ................... B01D 45/00 123/573
(Continued)

FOREIGN PATENT DOCUMENTS

CN 1210746 A 3/1999
CN 2865832 Y 2/2007
(Continued)

*Primary Examiner* — Charles Cooley
*Assistant Examiner* — Shirley S Liu
(74) *Attorney, Agent, or Firm* — Birch, Stewart, Kolasch & Birch, LLP

(57) ABSTRACT

A centrifugal separator for cleaning crankcase gas, containing oil, from an internal combustion engine, includes a stationary casing defining a separation space and including a first end portion, an opposite second end portion and an inner wall surface facing the separation space. The separator also includes an inlet channel for the gas to be cleaned, a gas outlet channel for the cleaned gas and an oil outlet for the separated the oil. A centrifuge rotor is provided in the separation space and includes a spindle and a plurality of separation discs carried by the spindle. The centrifuge rotor is rotated to create a rotating gas volume. An oil supply device supplies such a quantity of oil to the separation space that a flowing oil film is created on the inner wall surface during operation of the centrifugal separator.

13 Claims, 2 Drawing Sheets

(51) Int. Cl.
*B04B 11/02* (2006.01)
*B04B 9/06* (2006.01)

(52) U.S. Cl.
CPC .................. *B04B 2005/125* (2013.01); *F01M 2013/0422* (2013.01)

(58) Field of Classification Search
USPC ...................................................... 494/84, 15
See application file for complete search history.

(56) References Cited

U.S. PATENT DOCUMENTS

| | | | | |
|---|---|---|---|---|
| 4,946,433 | A | 8/1990 | Gorodissky et al. | |
| 5,203,999 | A | 4/1993 | Hugues | |
| 6,925,993 | B1 * | 8/2005 | Eliasson | B01D 45/16 123/572 |
| 8,172,917 | B2 | 5/2012 | Kup et al. | |
| 2003/0233932 | A1 | 12/2003 | Ekeroth | |
| 2006/0142135 | A1 * | 6/2006 | Hallgren | B01D 45/14 494/24 |
| 2008/0256912 | A1 | 10/2008 | Kup et al. | |
| 2011/0000372 | A1 | 1/2011 | Lagerstedt et al. | |
| 2011/0056374 | A1 | 3/2011 | Carlsson et al. | |

FOREIGN PATENT DOCUMENTS

| | | | | |
|---|---|---|---|---|
| CN | 101189414 | A | 5/2008 | |
| JP | 2008-540908 | A | 11/2008 | |
| SU | 1 704 839 | A1 | 1/1992 | |
| SU | 848070 | A1 | 1/1992 | |
| WO | WO 00/53332 | A1 | 9/2000 | |
| WO | WO 02/44530 | A1 | 6/2002 | |
| WO | WO 2004/022239 | A1 | 3/2004 | |
| WO | WO 2004022239 | A1 * | 3/2004 | B01D 45/14 |
| WO | WO 2005/087384 | A1 | 9/2005 | |
| WO | WO 2009/029022 | A1 | 3/2009 | |

* cited by examiner

CENTRIFUGAL SEPARATOR HAVING OIL COATING ON SIDEWALLS

THE FIELD OF THE INVENTION

The present invention refers to a centrifugal separator for cleaning a gas containing oil, especially for cleaning crank-case gases from an internal combustion engine, such as a diesel engine. More specifically, the present invention refers to a centrifugal separator according to the pre-characterizing portion of claim 1, see WO 2004/022239.

BACKGROUND OF THE INVENTION AND PRIOR ART

Crankcase gases from internal combustion engines contain oil in the form of an oil mist or oil droplets mixed with other impurities such as soot and hydrocarbons. Such impurities in the crank-case gases may form sticky substances. Furthermore, it is common to add various additives to the oil of the internal combustion engine in order to improve the properties of the oil for the lubrication and cooling of the internal combustion engine. However, such additives may have a negative effect due to the fact that the impurities, such as soot and hydrocarbons, form substances that are even more sticky.

The purpose of the centrifugal separator disclosed in WO 2004/022239 is to improve the lubrication of an upper bearing supporting the hollow spindle of the centrifuge rotor. The oil is conveyed through the hollow spindle and an upper opening to a small chamber from where the oil is conveyed through the upper bearing into the inlet to be mixed with the crankcase gases. A relatively small amount of oil is needed for the lubrication of the upper bearing. The opening of the hollow spindle of the centrifugal separator disclosed in WO 2004/022239 is configured to supply only such a relatively small quantity of oil sufficient for the lubrication of the upper bearing only. This prior art thus aims at keeping the quantity of oil supplied at a minimum.

One problem of the centrifugal separator disclosed in WO 2004/022239 and other prior art centrifugal separators for cleaning of crankcase gases is that the oil and impurities contained in the crankcase gas is very sticky, as mentioned above, so that sticky agglomerations of soot and impurities may attach to the inner parts of the centrifugal separator, especially the inner wall surface of the stationary casing.

WO 2009/029022 discloses another centrifugal separator for cleaning a gas containing liquid and solid impurities. The centrifugal separator of this prior art document comprises a supply device for supplying an aerosol through a nozzle into the inlet channel of the centrifugal separator. The aerosol, which may be formed by water, has the purpose of preventing the impurities from attaching to the separation discs.

WO 2005/087384 discloses another centrifugal separator for cleaning a gas. This centrifugal separator comprises a flushing nozzle arranged to supply a cleaning liquid for flushing the separation discs.

SUMMARY OF THE INVENTION

The object of the present invention is to remedy or alleviate the problems discussed above, and to avoid or reduce sticky agglomerations in the separation space of the centrifugal separator, especially on the inner wall surface of the casing of the centrifugal separator.

This object is achieved by the centrifugal separator initially defined characterized in that the oil supply device is configured to supply such a quantity of oil to the separation space that a flowing oil film is created on the inner wall surface during operation of the centrifugal separator.

The inventor of the present invention has realised that if an increased amount of oil is introduced into the separation space, and thereby mixed to the gas to be cleaned, an oil film may be created on the inner parts of the centrifugal separator, and especially on the inner wall surface of the stationary casing. The oil may advantageously be supplied continuously to the separation space during the operation of the centrifugal separator. In addition to the insight that there is a lower limit for the quantity of oil to be supplied in order to achieve the desired effect, i.e. to create an oil film, the inventor has also realized that there is also an upper limit. If too much oil is supplied to the separation space, the oil will contaminate the cleaned gas. Accordingly, the inventor has realized that there is a balance to be achieved, i.e. the quantity of oil is to be dimensioned within these limits.

Such an oil film will flow on the inner wall surface and thereby prevent soot and other impurities from clogging and getting stuck to the inner wall surface, and thus prevent agglomerations from being formed on the inner parts of the centrifugal separator. A more reliable and efficient separation of the gases will thus be ensured as long as the above described balance is maintained. Hence, too much oil being supplied will contaminate the cleaned air and result in unreliable and inefficient separation.

According to an embodiment of the invention, the oil supply device is provided to supply the oil to the rotating gas volume to rotate the oil and bring the rotating oil to the inner wall surface. The rotating gas volume will thus contribute to the formation and flowing of the oil film on the inner wall surface.

According to a further embodiment of the invention, the oil supply device comprises an inlet nozzle having an aperture diameter. Such an inlet nozzle may form a throttling member for the oil to be supplied.

The inlet may be dimensioned with respect to the aperture diameter to permit the appropriate quantity of oil to be supplied, in particular with regard to pressure difference between the crank-case and the separation space and to the rotary speed of the centrifugal separator. The skilled person should dimension the aperture such that a sufficient oil film is generated, but not of such amount that the cleaned gas will become contaminated by too much oil being supplied. This dimensioning may be achieved through standard testing procedure, a so called trial & error procedure. An important factor that will influence the suitable flow rate of oil for generating the oil film on the inner wall surface is the actual size of the centrifugal separator. Hence, a bigger separator requires more oil which affects the sizing of the aperture. Another factor is the configuration of the oil outlet, i.e. that it can drain the oil from the separation space at a sufficient rate. The amount of oil being separated and drained will also depend on the flow rate of contaminated gas to be cleaned. Furthermore, the rotary speed of the centrifuge rotor will also influence the drain rate, and more gas will in general require higher rotor speed to give sufficient separation of the increased amount of gas. A higher rotor speed will in most cases give a higher pressure in the separation space surrounding the rotor than in the crankcase—and a higher pressure in the separation space surrounding the rotor facilitates the discharge of oil from the separation space.

According to a further embodiment of the invention, the gas outlet channel is provided at the first end portion and the inlet nozzle is provided at the opposite second end portion. With such an arrangement, it is ensured that the oil supplied to the separation space is not mixed with the cleaned gas leaving the separation space. A further effect is that the rotating gas around the centrifuge rotor will distribute the oil film along the inner wall surface as it spirals along a helical path towards the gas outlet.

According to a further embodiment of the invention the centrifugal separator comprises a collecting space containing oil, in liquid form as well as an oil mist, and receiving a first end of the spindle. The collecting space may be provided in the proximity of the first end portion, preferably below the gas outlet channel. Moreover, the collecting space may be arranged to collect oil which is being drained from the separation space during the operation of the centrifugal separator.

According to a further embodiment of the invention, the centrifugal separator comprises an inner channel extending inside and along the spindle and being configured to transport oil from the collecting space through the inner channel and through the inlet nozzle provided at a second end of the spindle. With such a solution the oil in the collecting space may be utilized and recirculated to provide the oil film on the inner wall surface.

According to a further embodiment of the invention, the aperture diameter is in the range of 3 to 5 mm. Such a size of the aperture diameter has been shown to ensure a sufficient quantity of oil for the formation of the oil film at least in the case when the oil is transported through the inner channel of the spindle, and supplied to the separation space through the inlet nozzle at the second end of the spindle as an oil mist. Preferably, the aperture diameter may be in the range of 3.5 to 4.5 mm, especially about 4 mm.

According to a further embodiment of the invention, the oil supply device comprises an inlet nozzle having an aperture diameter, wherein the inner channel has a diameter that is greater than the aperture diameter. Advantageously, the diameter of the inner channel may be in the range of 5 to 7 mm.

According to a further embodiment of the invention, the inlet nozzle is provided inside a bearing, such as an upper bearing, attached to the spindle at the second end, wherein the oil is conveyed from the inlet nozzle through the bearing to the separation space. In such a way, the oil supply to the separation space may also be utilized for lubricating the bearing.

According to a further embodiment of the invention, the drive member comprises a turbine wheel, provided on the spindle in the collecting space, and a turbine nozzle provided in the collecting space to eject an oil jet against the turbine wheel thereby rotating the centrifuge rotor.

According to a further embodiment of the invention, the inlet nozzle is provided in the stationary casing and connected to an external pipe for feeding oil to the inlet nozzle. The inlet nozzle may thus extend through the stationary casing, for instance at the second end portion. According to this embodiment, the oil may be supplied at a pressure of 3-6 bars. The aperture diameter may then be 0.3 to 1.5 mm.

According to a further embodiment of the invention, the drive member comprises an electrical motor connected to the spindle. Such a separate drive member may in certain circumstances be advantageous. The drive member may also comprise such a separated motor in the form of a pneumatic motor or a hydraulic motor.

According to a further embodiment of the invention, the drive member is configured to rotate the centrifuge rotor with a rotary speed of 6000 to 12000 rpm, preferably 6000 to 10000 rpm.

According to a further embodiment of the invention, the centrifugal separator is configured in such a way that the second end portion is turned upwardly. The first end portion is then turned downwardly, which means that the collecting space is provided at a lower end of the centrifugal separator.

According to a further embodiment of the invention, the oil supply device is adapted to be connectable to the internal combustion engine for supply of pressurized lubricating oil from the internal combustion engine. Thanks to this embodiment no extra equipment is needed for the re-circulation of the oil. Instead, the pressurized lubricating oil from the internal combustion engine is used for the supply of oil to the separation space and for the generation of the oil film. When the spindle is rotated by means of the drive member comprising the turbine wheel, the pressurized lubricating oil may also be used for driving the centrifuge rotor.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS OF THE INVENTION

Figure 1:
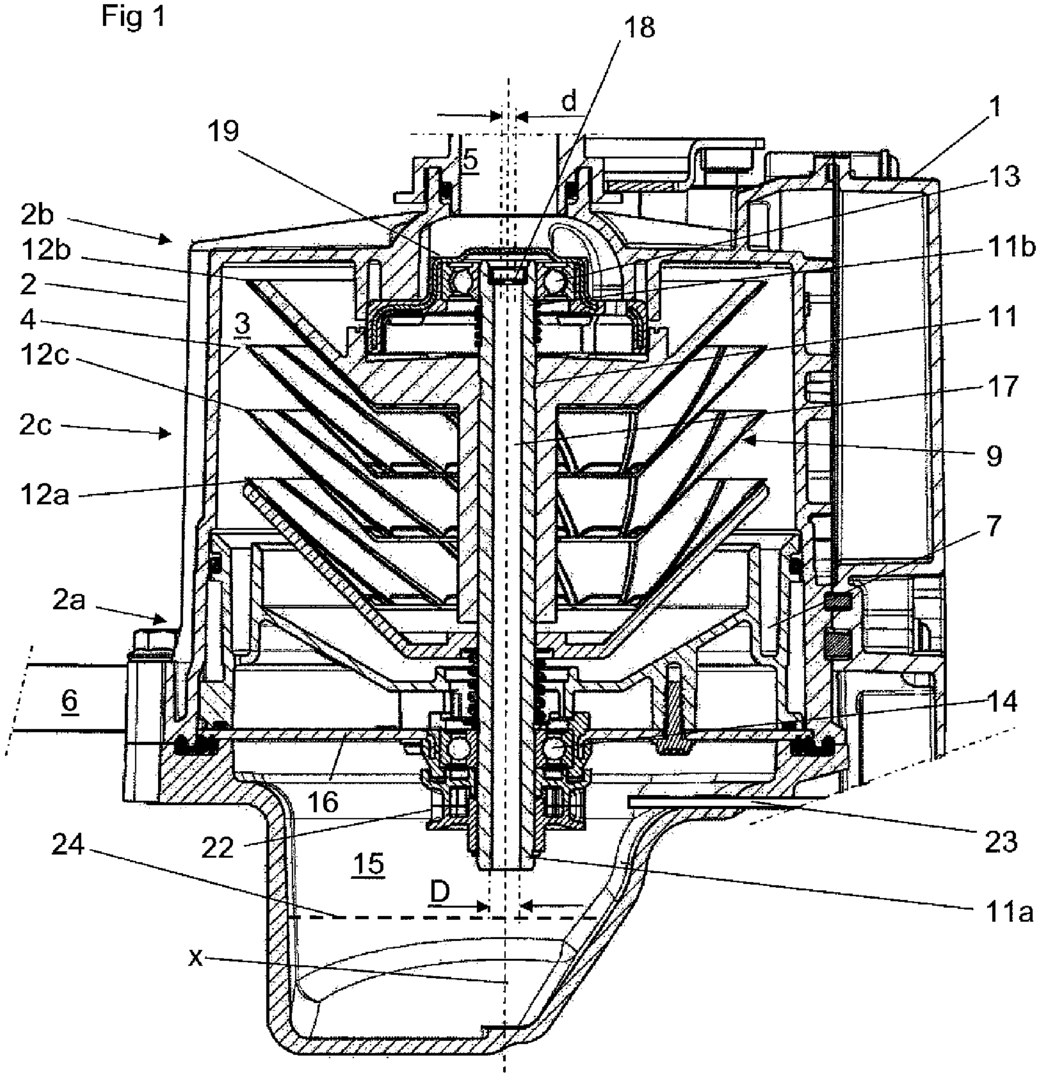
FIG. 1 discloses a sectional view of a centrifugal separator according to a first embodiment of the invention.

FIG. 1 discloses a first embodiment of a centrifugal separator for cleaning a gas containing oil, such a crankcase gases from an internal combustion engine (not disclosed). FIG. 1 also discloses a pressure control valve 1 designed to keep the pressure within a safe range in the crankcase of the internal combustion engine.

The centrifugal separator comprises a stationary casing 2 defining a separation space 3 within the stationary casing 2. The stationary casing 2 is stationary in relation to the internal combustion engine 1. The stationary casing 2 comprises a first end portion 2*a*, an opposite second end portion 2*b*, and an intermediate portion 2*c* provided between and adjoining the first end portion 2*a* and the second end portion 2*b*. In the embodiments disclosed, the first end portion 2*a* forms a lower portion during operation of the centrifugal separator, whereas the second end portion 2*b* forms an upper portion.

The stationary casing 2 has an inner wall surface 4 facing the separation space 3. A main part of the inner wall surface 4, which in particular in this case is considered, is the intermediate portion 2*c* extending around the separation space 3 between the first end portion 2*a* and the second end portion 2*b*.

The centrifugal separator also comprises an inlet channel 5, a gas outlet channel 6 and an oil outlet 7. The inlet channel 5 extends to the separation space 3 and forming an inlet for the crankcase gas to be cleaned. In the embodiments disclosed, the inlet channel 5 is provided at and extends through the second end portion 2*b*. The gas outlet channel 6 is provided for discharging the cleaned gas from the separation space 3. In the embodiments disclosed, the gas outlet channel 6 is provided at and extends through the first end portion 2*a* via the pressure control valve 1. The oil outlet 7 is provided for discharging the separated oil from the separation space 3. In the embodiments disclosed, the oil outlet 7 is provided at and extends through the first end portion 2*a*.

Moreover the centrifugal separator comprises a centrifuge rotor 9 and a drive member provided to rotate the centrifuge rotor 9 in a direction of rotation about an axis x of rotation to create a rotating gas volume. The oil is thus separated from the crankcase gases by means of centrifugal forces. The centrifuge rotor 9 is provided in the separation space 3 and extends from the first end portion 2*a* to the second end portion 2*b*. The centrifuge rotor comprises a spindle 11 and a plurality of separation discs 12*a*-12*c* carried by provided on the spindle 11.

The plurality of separation discs 12*a*-12*c* comprises or consists of a first separation disc 12*a* in the proximity of the first end portion 2*a* and in the proximity of a first end 11*a* of the spindle 11, a second separation disc 12*b* in the proximity of the second end portion 2*b* and in the proximity of a second end 11*b* of the spindle 11, and a plurality of intermediate separation discs 12*c* provided between the first separation disc 12*a* and the second separation disc 12*b*.

The spindle 11 is supported by a bearing 13 at the second end 11*b*, and by an additional bearing 14 at the first end 11*a*.

The separation discs 12*a*-12*c* extend outwardly from the spindle 11. In the embodiments disclosed, each of the separation discs 12*a*-12*c* has a frusto-conical shape. The separation discs 12*a*-12*c* are turned so that the frusto-conical shape of the separations discs 12*a*-12*c* points towards the first end portion 2*a*.

The centrifugal separator according to the first embodiment comprises a collecting space 15 containing oil and receiving the first end 11*a* of the spindle 11. The collecting space 15 is provided at the second end 11*b* of the spindle and below the gas outlet channel 6. A partition wall 16 is delimiting the collecting space 15 from the separation space 3. The additional bearing 14 is provided in connection with the collecting space 15, and is thus lubricated by the oil being drained from the separation space into the collecting space.

An inner channel 17 extends inside and along the spindle 11 from an opening at the first end 11*a* to the second end 11*b* and through an inlet nozzle 18 provided at a second end 11*b* of the spindle 11 and at the second end portion 2*b*.

The centrifugal separator also comprises an oil supply device configured to supply a quantity of oil to the separation space 3 in such a manner that a flowing oil film is created on the inner wall surface 4 during operation of the centrifugal separator. In the first embodiment, the oil supply device comprises inner channel 17 and the inlet nozzle 18, which permit transport oil from the collecting space 15 through the inner channel 17 and through the inlet nozzle 18.

The inlet nozzle 18 has an aperture diameter d, which is in the range of 3 to 5 mm, preferably in the range of 3.5 to 4.5 mm, for instance 4 mm. The inner channel 17 has a diameter D that is greater than the aperture diameter d. The inlet nozzle 18 will thus operate as a throttling member for the oil flowing through the inlet channel 17. The diameter D of the inner channel 17 may be in the range of 5 to 7 mm.

Figure 2:
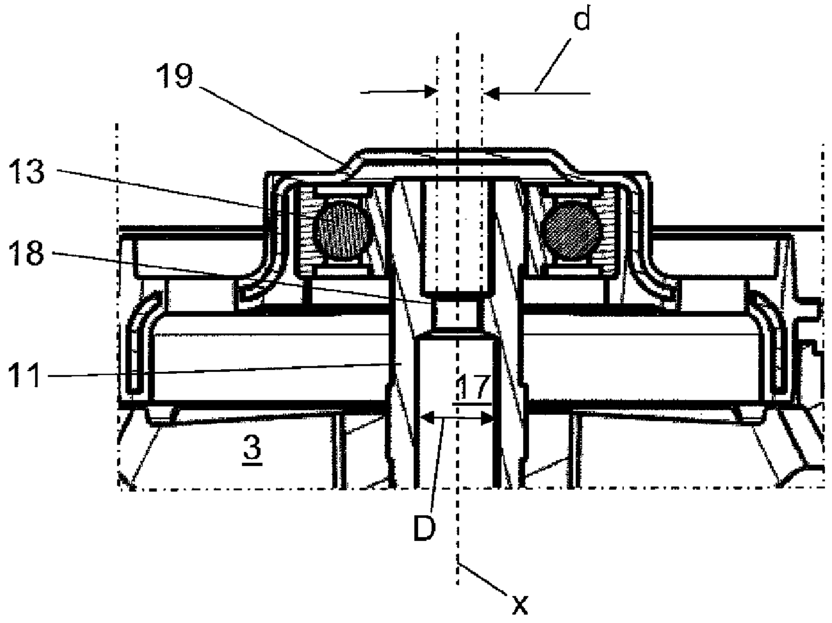
FIG. 2 discloses a sectional view of a part of a centrifugal separator according to a second embodiment of the invention.

As can be seen in FIGS. 1 and 2, the inlet nozzle 18 is provided at second end 11*b* of the spindle 11 at a small distance from an end surface of the second end 11*b*.

Furthermore, as can be seen in FIGS. 1 and 2, the inlet nozzle 18 is provided inside the bearing 13, which is attached to the spindle 11 at the second end 11*b*. A cover member 19 is provided outside the second end 11*b* enclosing a space outside the inner channel 17 and the inlet nozzle 18.

In the embodiments disclosed, the cover member 19 is also provided to support the bearing 13 in the stationary casing 2.

In the first embodiment, the drive member comprises a turbine wheel 22 and a turbine nozzle 23. The turbine wheel 22 is attached to the spindle 11 at the first end 11*a* and provided in the collecting space 15, above the level 24 of the oil contained in the collecting space 15. The turbine nozzle 23 is provided in the collecting space 15 to eject an oil jet against the turbine wheel 22 thereby rotating the centrifuge rotor 9.

Figure 3:
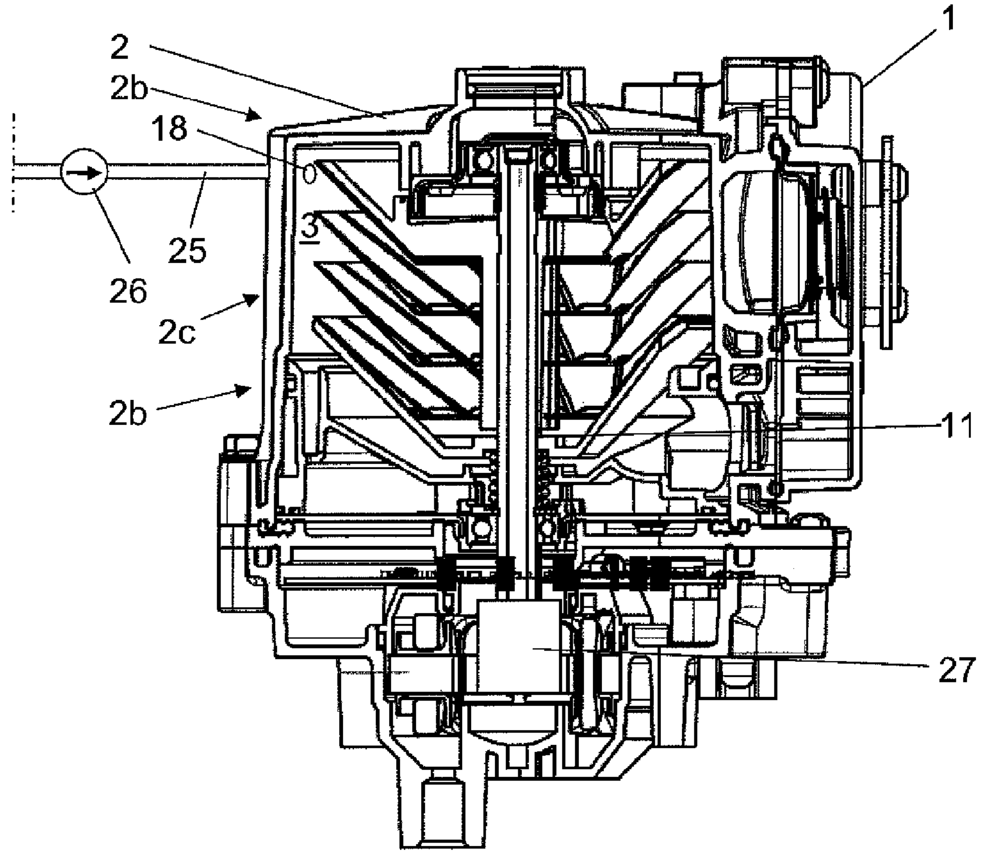
FIG. 3 discloses a sectional view of a centrifugal separator according to a third embodiment of the invention.

During operation of the centrifugal separator of the first embodiment, oil is feed to the turbine nozzle 23 towards the turbine wheel 22 to rotate the spindle 11 and the centrifuge rotor 9 in the stationary casing at a rotary speed of for instance 6000 to 12000 rpm, such as 6000 to 10000 rpm. When the oil jet hits the turbine—an oil mist is generated inside the collecting space 15. Oil will be collected in the collecting space 15 up to the level 24. Oil mist contained in the collecting space 15 above the level 24 will continuously during the operation be sucked into the inner channel 17 of the spindle 11, and conveyed to and through the inlet nozzle 18. From the inlet nozzle 18 the oil is guided by means of the cover member 19 and conveyed through the bearing 13 and to the separation space 3. The oil will then be supplied to the second separation disc 12*b*, and possible to one or more of the adjacent intermediate discs 12*c*. The oil is thus introduced to the rotating gas volume, and by means of centrifugal forces brought outwardly to the inner wall surface 4. Thanks to the rotating gas volume the rotating movement of the oil will continue on the inner wall surface 4 so that a flowing oil film is created on the inner wall surface 4. In the embodiments disclosed, the oil film will also move downwards due to the gas flow towards the gas outlet channel 6, and due to the gravity forces acting on the oil when the centrifugal separator is oriented as shown in FIGS. 1 to 3, with the axis x of rotation directed vertically.

The applicant has performed experiments to verify the functioning of the invention. These experiments show that with a rotary speed of 6000 to 12000 rpm and an aperture diameter of 3 to 5 mm, the quantity of the oil supplied to the separation space 4 may create a flowing oil film on the inner wall surface 4, and at the same time secure an efficient cleaning of the crankcase gas, i.e. with no or insignificant amounts of oil in the cleaned gas.

The experiments were performed with the centrifugal separator in a laboratory, but the centrifugal separator was adapted for use together with an internal combustion engine of the kind used for standard trucks. A standard truck or heavy road vehicle will typically be equipped with a diesel engine having a size in the range of 5 to 16 liters.

In the first embodiment, the inlet nozzle 18 is formed by a nozzle member which is inserted in the inner channel 17 at the second end 11*b* of the spindle 11. Such a nozzle member may be replaceable.

FIG. 2 refers to a second embodiment, that differs from the first embodiment only in that the inlet nozzle 18 is formed as an integrated portion of the spindle 11. Such an inlet nozzle 18 may be formed through machining of the spindle 11.

FIG. 3 illustrates a third embodiment which differs from the first and second embodiments in that the inlet nozzle 18 is provided in the stationary casing 2 and connected to an external pipe 25 for feeding oil to the inlet nozzle 18, e.g. by means of a pump 26. The pump 26 may be arranged and adapted exclusively for pumping oil to the inlet nozzle 18, or it may also be the lubricating oil pump of the combustion engine. The inlet nozzle 18 is also in the third embodiment provided at the second end portion 2*b* so that the oil film my flow along the whole, or a main part of the, inner wall surface 4.

In the third embodiment, the aperture diameter of the inlet nozzle 18 is 0.3 to 1.5 mm, preferably, 0.4 to 1.0 mm, for instance 0.5 mm. The oil may then be supplied to the inlet nozzle 18 at a pressure of 3-6 bars.

Furthermore, in the third embodiment, the drive member is replaced by and comprises a separate motor, e.g. an electrical motor 27, connected to the spindle 11 for rotating the spindle 11 and the centrifuge rotor 9. The separate motor may alternatively comprise a separate pneumatic motor or a separate hydraulic motor. The spindle 11 and the centrifuge rotor 9 may also be driven by means of the crankshaft of the internal combustion engine.

The present invention is not limited to the embodiments disclosed and may be varied and modified within the scope of the following claims.

The invention claimed is:

1. A centrifugal separator for cleaning crankcase gas, containing oil, from an internal combustion engine, said centrifugal separator comprising:

a stationary casing defining a separation space and comprising a first end portion and an opposite second end portion, wherein the stationary casing has an inner wall surface facing the separation space;

an inlet channel, extending to the separation space and forming an inlet for the gas to be cleaned;

a centrifuge rotor, said centrifuge rotor being provided in the separation space and extending from the first end portion to the second end portion, wherein the centrifuge rotor comprises a spindle and a plurality of separation discs carried by the spindle;

a drive member provided to rotate the centrifuge rotor in a direction of rotation about an axis of rotation to create a rotating gas volume, whereby oil is separated from the gas by centrifugal forces;

a gas outlet channel for discharging the cleaned gas from the separation space;

an oil outlet for discharging the oil from the separation space; and an oil supply device, the oil supply device having an inlet nozzle, wherein the inlet nozzle is provided in the stationary casing and is connected to an external pipe for feeding oil to the inlet nozzle.

2. The centrifugal separator according to claim 1, wherein the drive member comprises an electrical motor connected to the spindle.

3. The centrifugal separator according to claim 1, wherein the drive member is configured to rotate the centrifuge rotor with a rotary speed of 6000 to 12000 rpm.

4. The centrifugal separator according to claim 1, wherein the centrifugal separator is configured in such a way that the second end portion is turned upwardly.

5. The centrifugal separator according to claim 1, wherein the oil supply device is adapted to be connectable to the internal combustion engine for supply of pressurized lubricating oil from the internal combustion engine.

6. The centrifugal separator according to claim 1, wherein the drive member is configured to rotate the centrifuge rotor at a first rotational speed, wherein the inlet nozzle has an aperture diameter to permit a sufficient quantity of oil to be supplied with respect to a pressure difference between the crankcase and the separation space and the rotary speed of the centrifuge rotor, wherein the aperture diameter permits the sufficient quantity of oil to be supplied at the first rotational speed of the centrifuge rotor.

7. The centrifugal separator according to claim 1, further comprising a pump in the external pipe.

8. The centrifugal separator according to claim 1, wherein the oil supply device is provided to supply the oil to the rotating gas volume to rotate the oil and bring the rotating oil to the inner wall surface.

9. The centrifugal separator according to claim 1, wherein the gas outlet channel is provided at the first end portion and the inlet nozzle is provided at the opposite second end portion.

10. The centrifugal separator according to claim 1, wherein the inlet nozzle has an aperture diameter, and wherein the aperture diameter is in the range of 3 to 5 mm.

11. The centrifugal separator according to a claim 1, wherein the inlet nozzle has an aperture diameter, wherein the aperture diameter is in the range of 3.5 to 4.5 mm.

12. The centrifugal separator according to claim 10, wherein the drive member comprises a turbine wheel, provided on the spindle in the collecting space, and a turbine nozzle is provided in the collecting space to eject an oil jet against the turbine wheel, thereby rotating the centrifuge rotor.

13. A centrifugal separator for cleaning crankcase gas, containing oil, from an internal combustion engine, said centrifugal separator comprising:

a stationary casing defining a separation space and comprising a first end portion and an opposite second end portion, wherein the stationary casing has an inner wall surface facing the separation space;

an inlet channel, extending to the separation space and forming an inlet for the gas to be cleaned;

a centrifuge rotor, said centrifuge rotor being provided in the separation space and extending from the first end portion to the second end portion, wherein the centrifuge rotor comprises a spindle and a plurality of separation discs carried by the spindle;

a drive member provided to rotate the centrifuge rotor in a direction of rotation about an axis of rotation to create a rotating gas volume, whereby oil is separated from the gas by means of centrifugal forces;

a gas outlet channel for discharging the cleaned gas from the separation space;

an oil outlet for discharging the oil from the separation space;

an oil supply device; and means for forming a flowing oil film on the inner surface of the stationary casing during operation of the centrifugal separator, wherein the means for forming a flowing oil film is an inlet nozzle provided in the stationary casing and connected to an external pipe for feeding oil to the inlet nozzle.

* * * * *